United States Patent [19]

Doyle et al.

[11] 4,318,840

[45] Mar. 9, 1982

[54] BINDERS FOR FOUNDRY CORE SANDS

[75] Inventors: James E. Doyle, Carpentersville; Russell B. Lembke, Crystal Lake, both of Ill.

[73] Assignee: The Quaker Oats Company, Chicago, Ill.

[21] Appl. No.: 217,450

[22] Filed: Dec. 17, 1980

[51] Int. Cl.$^3$ .......................... C08G 8/04; C08L 61/06
[52] U.S. Cl. .................................... 523/144; 164/526; 528/27; 528/137; 528/140; 528/144; 528/153; 528/159; 524/594
[58] Field of Search .................. 528/153, 159, 27, 137, 528/140, 144; 260/38; 164/526, 43

[56] References Cited

U.S. PATENT DOCUMENTS

| | | | |
|---|---|---|---|
| 3,058,954 | 10/1962 | Brown et al. | 528/153 |
| 3,403,721 | 10/1968 | Robins et al. | 164/526 |
| 3,409,579 | 11/1968 | Robins | 260/38 |
| 4,108,809 | 8/1978 | Narayan et al. | 528/153 |

*Primary Examiner*—J. Ziegler
*Attorney, Agent, or Firm*—Neuman, Williams, Anderson & Olson

[57] ABSTRACT

Binders for foundry core sand and other binder applications are produced from the tars resulting from production of bisphenol A.

8 Claims, No Drawings

BINDERS FOR FOUNDRY CORE SANDS

This invention relates to binder compositions and in particular to binder compositions for core sand and the like used in metal foundries.

The chemical 2,2-bis-(4-hydroxyphenyl)propane, commonly known as bisphenol A, finds numerous uses in the chemical arts. Bisphenol A is produced by the condensation reaction of phenol and acetone and bisphenol A of relatively high purity is obtained from the reaction mixture by distillation. However, it is not economically feasible in commercial practice to distill off all of the bisphenol A. The bottoms from the distillations, called tars, typically contain some pure bisphenol A, phenol, dimers and other more advanced polymers. In the past these tars were of no particular use in the industry and were usually burned as a fuel.

In accordance with the present invention we have found that the tars resulting from distillation of bisphenol A from the condensation reaction of phenol and acetone can be advantageously used to form binders for core sands and the like used in metal foundary operations.

The expression "core sand" is used herein to include sand used in making shapes of all sorts for foundry purposes, including sand shapes which are to be used as mold cores, sand shapes useful in other casting processes, including sand shapes which are made in patterns and cured therein as well as free standing sand shapes which may be cured in conventional ovens or in microwave ovens for any desirable purpose in foundry work.

The core sand binders according to this invention are produced by dissolving a BPA tar in furfuryl alcohol and reacting the mixture with paraformaldehyde. The expression "BPA tar" as used herein means the bottoms resulting after distillation of bisphenol A from the condensation reaction mixture of phenol and acetone. To prepare the binders, a BPA tar is added to furfuryl alcohol in an amount from about 20 50% by weight. Then paraformaldehyde is added to the mixture in an amount from about 15 to about 45% by weight of the BPA tar. Preferably, the amount of paraformaldehyde employed in the binder is about 12 parts of paraformaldehyde to 25 parts of the BPA tar. The BPA tar-furfuryl alcohol-paraformaldehyde mixture is catalyzed with from about 0.5 to 10% by weight of the mixture of sodium hydroxide or sodium carbonate, or potassium hydroxide, potassium acetate, sodium acetate or the like. The mixture is reacted at a temperature on the order of about 100° C. to 110° C. (approximately reflux temperatures) until the viscosity of the composition reaches a desired level.

The temperature of the reaction is maintained at approximately reflux temperature and to this end liquids such as water or methanol can be added to the mixture. When using methanol to control the reflux temperature, longer reaction times are usually required. Preferably, water in amounts of up to about 4% by weight of the mixture is used to control the reflux temperature. The usable viscosity range is from about 1.7' to 4.0' seconds as measured on the bubble viscometer in accordance with the standard method set forth in the American Society for Testing and Materials, ASTM designation D1545-63. The preferred viscosity range in from about 1.7' to 2.3' seconds. The composition is then neutralized, if necessary, to a pH from about 6 to 7.5 with an effective amount of a suitable acid, such as, for example, formic or toluene sulfonic acid, chloroacetic acid, or any other suitable medium-weak acid. The resulting composition is eminently suitable as a binder for core sands with the binder exhibiting desired short work times and good tensile strengths.

BPA tars are available commercially from various sources, including United States Steep Corporation under the designation Liquibis, Shell Chemical Company under the designation Shell Off-Spec Bisphenol A and the General Electric Company under the designations V-420 and V-435. Typical composition values on these materials are as follows:

| BPA TAR | p,p' BPA[1] | Chroman I[2] | Phenol[3] | IPP[4] | IPP Dimer[5] | o,p' BPA[6] | BPX-I[7] |
|---|---|---|---|---|---|---|---|
| | PERCENT BY WEIGHT | | | | | | |
| V-435 | 45.6 | 5.8 | 1.8 | 0.2 | 9.2 | 15.2 | 0.2 |
| V-420 | 38.1 | 0.8 | 0.4 | 0.2 | 2.1 | 0.3 | 16.8 |

[1] = p,p bisphenol A 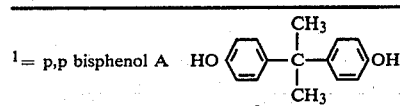

[2] = 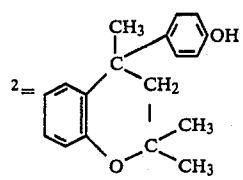

[3] = phenol 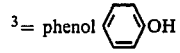

[4] = isopropenyl phenol 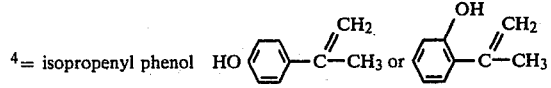

[5] = isopropenyl phenol cylic dimer 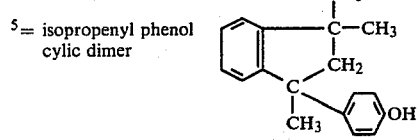

or isopropenyl phenol linear dimer 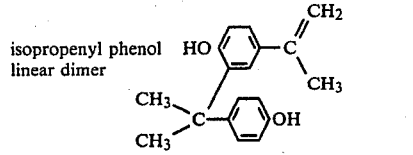

[6] = o,p bisphenol A 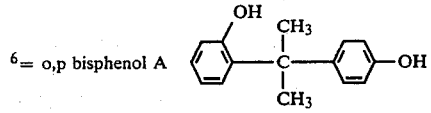

[7] = trimer 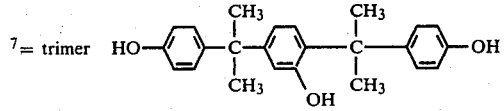

The core sand binders of this invention are applied to said in conventional manner and are catalyzed to form a rigid material by acids such as toluene-sulfonic acid, phosphoric acid, benzene-sulfonic acid, xylene-sulfonic acid, as well as other standard acid catalysts known and used in the art. The acid catalysts are used in amounts ranging from about 15 to 30% by weight of the binder. Curing of the binders is accomplished by conventional curing methods.

It is generally preferred to use with the binders of this invention is silane glass or silica adhesion promoter in an amount ranging from about 0.1% to 3% based on the weight of the binder. Such silane adhesion promoters are well known in the art and include, for example, gamma-mercaptopropyltrimethoxysilane, N-beta-(aminoethyl)-gamma-aminopropyltrimethoxysilane, beta-(3,4-epoxycyclohexyl)ethyltrimethoxysilane, gamma-glycidoxypropyltrimethoxysilane, gamma-aminopropyltriphenoxysilane, gamma-aminopropyltribenzoyoxysilane, gamma-aminopropyltrifurfuroxysilane, gamma-aminopropyltri (o-chlorophenoxy)silane, gamma-aminopropyltri (p-chlorophenoxy)silane, gamma-aminopropyltri(tetrahydrofurfuroxy)silane, methyl[2-gamma-triethoxysilypropylamino)ethyl amino]3-propionate in methanol, modified aminoorganosilane, Ureido-silane, mercaptoethyltriethoxysilane, chloropropyltrimethoxysilane, vinyltrichlorosilane, vinyltriethoxysilane, vinyltrimethoxysilane, gamma-methacryloxypropyltrimethoxysilane, gamma-methacryloxypropyl-tri(2-methoxyethoxy)-silane, gamma-glycidoxypropyltrimethoxysilane, vinyltriacetoxysilane, gamma-mercaptopropyltrimethoxysilane, gamma-aminopropyltriethoxysilane, N-beta(aminoethyl)-gamma-amino-propyltrimethoxysilane.

The present invention will be further described in the following examples.

EXAMPLE 1

A binder in accordance with this invention was prepared from a blend of furfuryl alcohol (70 parts) and BPA tar V-435 (30 parts). To 84.4 parts of said blend were added 4 parts of water and 11.6 parts paraformaldehyde. The resulting mix was catalyzed with 0.005 parts sodium hydroxide and heated to reflux temperature (110° C.) for 1½ hours. The reaction continued to a 2.5 second bubble viscosity, ASTM D1545-63. The mixture was then neutralized with formic acid to pH 6. The resulting binder composition had a Brookfield viscosity of 356 centipoises at 25° C. and contained 0.4% free formaldehyde and 9.4% water.

EXAMPLE 2

The procedure of Example 1 was followed except that BPA tar V-420 was used in lieu of BPA tar V-435. The resulting binder had a Brookfield viscosity of 420 centipoises at 25° C. and contained 0.20% free formaldehyde and 9.41% water.

EXAMPLE 3

A binder in accordance with the invention was prepared following the procedure of Example 2 using as a catalyst 0.5% by weight of 50/50 solution of sodium hydroxide in water. The reaction was conducted at a temperature of 100° C. for 5½ hours. The resulting binder had a viscosity of 246 centipoises, Brookfield, at 25° C.

The BPA tars V-435 and V-420 were commercially available tars obtained from the General Electric Company and analyzed as follows:

|                 | BPA Tar V-420 | BPA Tar V-435 |
| --------------- | ------------- | ------------- |
| P,P'-Bisphenol A | 60            | 43.1          |
| O,P'-Bisphenol A | 0.25          | 18.1          |
| Dimers          | 2.75          | 10.9          |
| Phenol          | 0.45          | 1.4           |

EXAMPLE 4

The work times and tensile strengths of various binders were evaluated. In each test 0.30 parts A-1160 Ureido silane (T.M. Union Carbide Co.) were added to each respective binder. Then 3000 parts Wedron 5025 silica sand were admixed with 30 parts of each respective binder and 20% of a 65% solution of toluene sulfonic acid in water (based on the weight of the binder). The sand-binder-catalyst mixes were charged into a multiple mold shaping element and allowed to cure. The tensile strengths were tested after storage overnight at ambient relative humidity of 63% and in a separate test after storage overnight at 92% relative humidity. The strengths listed are an average of six determinations in each instance.

The work times were determined by observation of a portion of each binder-sand-catalyst mix which was set aside for that purpose. The table below contains the results of these tests.

TABLE I

| Test | Binder | Work Time (minutes) | Tensile strengths (psi) 63% R.H. | 92% R.H. |
| --- | --- | --- | --- | --- |
| A | Binder of Example 1 | 12 | 265 | 165 |
| B | Binder of Example 2 | 10 | 235 | 160 |
| C | Commercial Binder Containing 95 parts furfuryl alcohol and 5 parts resorcinol | 22 | 315 | 250 |

The above results indicate that the binders of the present invention provided shorter work times which are highly desirable for no-bake foundry systems, while providing comparable tensile strengths to the commercial furfuryl alcohol-resorcinol binder.

EXAMPLE 5

This example illustrates the effect of incremental additions of furfuryl alcohol to the binders of the present invention.

The binder was prepared using a charge 77.5 parts of 50/50 blend of furfuryl alcohol/BPA tar V-420, 17.4 parts of paraformaldehyde and 5.1 parts water. The mixture was catalyzed with 2 parts of a 50% solution of sodium hydroxide in water. After 30 minutes of reflux at 110° C. the bubble viscosity had advanced from 5.7 to 14.4 seconds. The product was then cooled at room temperature and adjusted to a pH of 7.2 with formic acid. Analysis revealed that the binder thus prepared contained 0.32 formaldehyde and 11.4% water with a viscosity of 1500 centipoises.

Five aliquots of this binder (which contains 50/50 blend of furfuryl alcohol to BPA-t) were blended respectively with sufficient furfuryl alcohol to provide the ratios of furfuryl alcohol to BPA tar indicated in Table II. To each respective mix was added 0.3% (based on the weight of the binder) of A-1160 Ureidosilane (Union Carbide Co.). In each test, 30 parts of each furfuryl alcohol-diluted binder was admixed with 3000 parts of Wedron 5025 sand. The sand was pre-catalyzed with 7 parts of 65% toluene sulfonic acid in water.

The tensile strengths and work times were tested by the general method described in Example 4. The immediate tensile strengths were tested after storage overnight at ambient humidity (56%) and in another series of tests after storage overnight at 92% high humidity. The results are listed in Table II.

TABLE II

| Furfuryl Alcohol: BPA Tar | Work Time (minutes) | Tensile Strength (psi) 56% R.H. | Tensile Strength (psi) 92% R.H. |
|---|---|---|---|
| 50:40[a] | 20 | 376 | 184 |
| 60:30[a] | 25 | 418 | 232 |
| 70:20[a] | 36 | 381 | 242 |
| 80:10[a] | 41 | 339 | 248 |
| 62;31[b] | 8 | 356 | 193 |

[a]10% water in final binder mix.
[b]7% water in final binder mix.

EXAMPLE 6

This example illustrates the effect of varying the amount of paraformaldehyde in preparing binders of the invention. The binders were prepared following the procedure of Example 1 with the mix being catalyzed with 1% of a 50/50 solution of sodium hydroxide in water. Reactions were carried out at reflux temperature for 1 to 2 hours.

The tensile strengths of the binders were evaluated according to the procedure of Example 4. In each test 0.30 parts of A-1160 Ureido silane were added to each respective binder. The tensile strengths were tested after storage overnight at a relative humidity of 40% and in a separate test after storage overnight at a 90% relative humidity. The data pertaining to these tests are shown in the following table.

vided by the American Society for Testing and Materials, ASTM D189-65.

In each test listed in Table III, a 5 gram sample of the resin listed was weighed into a tared crucible. To each sample was added 10% to a 50% solution of $ZnCl_2$ in water. (The $ZnCl_2$ solution is a heat-activated latent acid catalyst.) The acid catalyzed resins were cured in an oven for 2 hours at 200° F. and then for 16 hours at 300° F. The samples were then removed from the oven and allowed to cool. When cool, the samples were weighed to determine the percent of solids and each sample was then put on a Conradson apparatus and a meeker burner was placed under it. The samples were burned for 30 minutes. The flame was then removed, the samples cooled and reweighed.

The "percent carbon" listed in Table III was determined to be the ratio: Final Weight After Burning/Original Weight.

TABLE III

| Test | Resin | % Carbon |
|---|---|---|
| 1 | Furfuryl alcohol + 10% BPA[a] | 49.7 |
| 2 | Furfuryl alcohol + 10% V-420[b] | 44.9 |
| 3 | Furfuryl alcohol + 25% V-420[b] | 44.8 |
| 4 | Furfuryl alcohol BPA-tar-420-paraformaldehyde binder[c] | 47.7 |

[a]BPA - bisphenol A (a cold set mixture of BPA and FA ®)
[b]V-420 (BPA-tar - Trade designation of the General Electric Company)
[c]A resin binder in accordance with the present invention and prepared by the general method set forth in Example 2 with the ratio of furfuryl alcohol:BPA tar:paraformaldehyde being 60:40:11.5

|  | Binder 1 | Binder 2 | Binder 3 | Binder 4 | Binder 5 |
|---|---|---|---|---|---|
| % Furfuryl Alcohol | 59.6 | 59.6 | 59.2 | 59.6 | 59.6 |
| % Water | 3.9 | 3.9 | 3.9 | 3.9 | 3.9 |
| % BPA Tar-420 | 29.8 | 27.9 | 25.4 | 23.1 | 19.9 |
| % Paraformaldehyde | 6.7 | 8.6 | 11.5 | 13.4 | 16.6 |
| Ratio BPA Tar-V-420/Paraformaldehyde | 4.45 | 3.24 | 2.21 | 1.72 | 1.20 |
| Reaction time | 120 | 90 | 70 | 120 | 90 |
| Bubble Viscosity Analysis | 1.9 | 1.9 | 1.7 | 1.9 | 1.9 |
| % Formaldehyde | 0.2 | 0.4 | 0.2 | 0.4 | 2.7 |
| % Water | 7.0 | 8.4 | 7.8 | 8.8 | 8.7 |
| Tensile Strength (psi) | 40% RH 160 / 90% RH 135 | 40% RH 235 / 90% RH 160 | 40% RH 290 / 90% RH 150 | 40% RH 310 / 90% RH 190 | 40% RH 305 / 90% RH 220 |

EXAMPLE 7

A series of tests were performed to compare the "percent carbon" yield of various cold set furfuryl alcohol-containing resins with the binders of the present invention.

The general method employed to determine "percent carbon" yield was the Conradson Carbon Residue of Petroleum Products method, a standard method pro-

EXAMPLE 8

This example provides a comparison of a binder of this invention with binders prepared following the procedure of Example 3 using pure samples of bisphenol A and phenol. The testing of the binders was conducted as described in Example 4 and results are shown below.

| Binder Composition | % | Catalyst | % | Work Time | Strip Time | Tensile Strengths 90% High | Tensile Strengths 38% AMB |
|---|---|---|---|---|---|---|---|
| Furfuryl Alcohol/Pure BPA/Formaldehyde | 1 | 65% solution of Toluene sulfonic Acid | 20 | 5 | ~25 | 140 | 215 |
| Furfuryl Alcohol/Phenol/Formaldehyde | " | 65% solution of Toluene sulfonic Acid | " | 11 | ~40 | 180 | 255 |
| Binder of Example 3 | " | 65% solution of Toluene sulfonic Acid | " | 15 | ~55 | 160 | 230 |

EXAMPLE 9

A number of binders according to this invention were prepared using Shell Chemical Company Off-Specification Bisphenol A as the BPA tar. This material generally contains approximately 80–88% bisphenol A monomer. The amounts of furfuryl alcohol, Shell Off-Specification Bisphenol A and paraformaldehyde used to prepare the binders and the reaction conditions are shown in the table below. The reactions were catalyzed with 0.5% of 50% solution of sodium hydroxide in water. The tensile strength data shown in the table was obtained following the procedure of Example 4. The first value for tensile strength shown in the table was obtained after storage overnight at a relative humidity of 93 and the second value was obtained after storage overnight at a relative humidity of 40. The viscosity values reported in the table are Brookfield viscosity values at 25° C.

| Charge | Binder 1 | Binder 2 | Binder 3 | Binder 4 |
|---|---|---|---|---|
| % Furfuryl Alcohol | 57.73 | 67.67 | 58.05 | 53.52 |
| % Shell Off-Spec BPA | 26.90 | 18.86 | 18.86 | 33.01 |
| % Paraformaldehyde | 11.54 | 9.61 | 19.23 | 9.60 |
| Ratio Off-Spec BPA/Paraformaldehyde | 2.33/1 | 1.96/1 | 0.98/1 | 3.44/1 |
| Product | | | | |
| Reaction time at Reflux | 80 mins | 165 mins | 95 mins | 60 mins |
| % Formaldehyde | 0.44 | 0.22 | 4.67 | 0.47 |
| % Water | 10.01 | 8.77 | 10.59 | 9.96 |
| Viscosity (cps) | 222.5 | 111.5 | 190.5 | 204.0 |
| Tensiles (psi) | 325/420 | 380/500 | 345/425 | 300/425 |
| | 290/360 | 335/460 | 290/375 | 200/285 |

EXAMPLE 10

A number of binders according to this invention were prepared using United States Steel Corporation Liquibis as the BPA tar. This material generally contains approximately 35% free phenol. The amounts of furfuryl alcohol, Liquibis and paraformaldehyde used to prepare the binders and the reaction conditions are shown in the table below. The reactions were catalyzed with a 50% solution of sodium hydroxide in water as shown in the table. The tensile strength data shown in the table was obtained following the procedure of Example 4. The first value of tensile strength shown in the table was obtained after storage overnight at a relative humidity of 22 and the second value was obtained after storage overnight at a relative humidity of 86.

| Charge | Binder 1 | Binder 2 | Binder 3 |
|---|---|---|---|
| % Furfuryl Alcohol | 62.85 | 62.85 | 66.78 |
| % Liquibis | 20.95 | 20.95 | 22.27 |
| % Paraformaldehyde | 12.20 | 12.20 | 6.9 |
| Ratio Liquibis/Paraformaldehyde | 1.72 | 1.72 | 3.23 |
| % 50% Sodium Hydroxide | 2.0 | 2.0 | 0.5 |
| Product | | | |
| Viscosity | 3.5 sec | 1.7 sec | 0.8 sec |
| Reaction Time | 2.5 hrs | 1.5 hrs | |
| % Formaldehyde | 0.25 | 0.81 | 0.31 |
| % Water | 10.8 | 9.12 | 7.67 |
| Tensile Strength (psi) 22 RH | 227 | 262 | 203 |
| 86 RH | 112 | 147 | 131 |

Compositions in accordance with the present invention have wide applicability as binders not only in the metal founding art but also in other similar applications in which resinous binders are employed, such as for the production of carbon articles such as carbon seals, carbon vanes and reclaimed coke, and for the production of composite articles such as fiberglass and the like. The following examples are representative of additional binder applications.

EXAMPLE 11

Approximately 2% of triethylenetetramine (TETA) and 70–75% carbon particles are thoroughly blended. To this dry amine-carbon mixture is added 16–23% of a liquid mixture of a "BPA bar" binder prepared as described above and adjusted to a viscosity of 2500 centipoises by the addition of furfuryl alcohol. The mixing apparatus is cooled throughout the blending of the ingredients. Within about 10 minutes of the addition of the resin binder system, the temperature of the resulting mixture starts dropping gradually from a peak of 50°–60° C. Mixing of the ingredients is continued for a total of twenty minutes when a dry, free-flowing particulate solid is obtained.

The free-flowing powder was later placed into a preheated (60°–65° C.) extruder and extruded through a die into rods. The green carbon rods were baked and thoroughly carbonized by baking in a reducing atmosphere with a programmed temperature rise to 650° C. and holding at that temperature for 48 hours. When carbonized, the rods and satisfactory density and resistivity for use as electrode. No bleeding or cracking was observed. The stack gases from the carbonization furnace were reduced in objectionable gases.

EXAMPLE 12

Twelve hundred grams of calcined anthracite were mixed with 150 grams of a "BPA tar" binder prepared as set forth above, 150 grams of furfuryl alcohol and 30 grams of zinc chloride (50% ethanol solution). The above mixture is mixed to a uniform consistency and diluted with furfuryl alcohol, if necessary, to a viscosity of 200 centipoises, Brookfield at 25° C. The resulting mixture was compacted or tamped into place between two carbon blocks, cured at 200° and carbonized in a programmed temperature rise to 1000° C. at 10° C. per hour. The resulting carbonized assembly was tested for tensile force, i.e., the force required to pull the ramming mix from the carbon block. A high adhesion or bond of the block to the ramming mix was noted.

Those modifications and equivalents which fall within the spirit of the invention are to be considered a part thereof.

What is claimed is:

1. A binder comprising the product prepared by dissolving in furfuryl alcohol the bottoms from distillation of 2,2-bis-(4-hydroxyphenyl)propane and reacting therewith paraformaldehyde.

2. A binder in accordance with claim 1 which also includes a silane.

3. A binder for foundry core sands in accordance with claim 1.

4. A process for manufacturing foundry sand shapes for use as cores and molds comprising placing a sand mix in a shaping element and hardening the mix in the shaping element, the sand mix comprising sand, an acid catalyst and a binder comprising the product prepared by dissolving in furfuryl alcohol the bottoms from distillation of 2,2-bis-(4-hydroxyphenyl)propane and reacting therewith paraformaldehyde.

5. A process in accordance with claim 4 in which the binder also includes a silane.

6. A process for preparing a binder composition which comprises dissolving in furfuryl alcohol the bottoms from distillation of 2,2-bis(4-hydroxyphenyl)propane and reacting therewith paraformaldehyde at an elevated temperature.

7. A process in accordance with claim 6 wherein the reaction with paraformaldehyde is conducted at reflux temperature.

8. A process in accordance with claim 6 wherein the reaction product is neutralized to a pH of about 6 to 7.5.

* * * * *

UNITED STATES PATENT AND TRADEMARK OFFICE
CERTIFICATE OF CORRECTION

PATENT NO. : 4,318,840
DATED : March 9, 1982
INVENTOR(S) : JAMES E. DOYLE and RUSSELL B. LEMBKE It is certified that error appears in the above-identified patent and that said Letters Patent are hereby corrected as shown below:

Column 1, line 15, "tions" should be -- tion --
         line 23, "foundary" should be -- foundry --
         line 41, "20 50%" should be -- 20 to 50% --
         line 66, "in" should be -- is --

Column 2, line 8, "Steep" should be -- Steel --
         line 61, "said" should be -- sand --

Column 4, line 42, "ofthe" should be -- of the --

Column 7, line 51, "of" should be -- for --

Column 8, line 21, "bar" should be -- tar --
         line 37, "and", first occurrence, should be -- had --.

Signed and Sealed this

Twenty-fifth Day of May 1982

[SEAL]

Attest:

GERALD J. MOSSINGHOFF

Attesting Officer     Commissioner of Patents and Trademarks